(12) United States Patent
Lazur

(10) Patent No.: US 9,708,226 B2
(45) Date of Patent: Jul. 18, 2017

(54) METHOD FOR PRODUCING HIGH STRENGTH CERAMIC MATRIX COMPOSITES

(71) Applicant: Rolls-Royce Corporation, Indianapolis, IN (US)

(72) Inventor: Andrew J. Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 389 days.

(21) Appl. No.: 14/204,714

(22) Filed: Mar. 11, 2014

(65) Prior Publication Data

US 2016/0159702 A1    Jun. 9, 2016

Related U.S. Application Data

(60) Provisional application No. 61/793,945, filed on Mar. 15, 2013.

(51) Int. Cl.
| | |
|---|---|
| C23C 16/32 | (2006.01) |
| C04B 41/87 | (2006.01) |
| C04B 35/628 | (2006.01) |
| C04B 35/80 | (2006.01) |

(52) U.S. Cl.
CPC ........ *C04B 41/87* (2013.01); *C04B 35/62863* (2013.01); *C04B 35/62868* (2013.01); *C04B 35/62871* (2013.01); *C04B 35/62873* (2013.01); *C04B 35/62884* (2013.01); *C04B 35/62894* (2013.01); *C04B 35/62897* (2013.01); *C04B 35/806* (2013.01); *C04B 2235/3826* (2013.01); *C04B 2235/428* (2013.01); *C04B 2235/5244* (2013.01); *C04B 2235/614* (2013.01)

(58) Field of Classification Search
CPC ....... C23C 16/325; C23C 16/32; C23C 16/26; C23C 16/34; C23C 16/342
USPC ...................................... 427/249.2
See application file for complete search history.

(56) References Cited

U.S. PATENT DOCUMENTS

| | | | |
|---|---|---|---|
| 4,415,609 A | 11/1983 | Debolt et al. | |
| 4,476,178 A | 10/1984 | Veltri et al. | |
| 4,628,002 A | 12/1986 | Suplinskas et al. | |
| 4,980,202 A | 12/1990 | Brennan et al. | |
| 5,021,367 A | 6/1991 | Singh et al. | |
| 5,079,039 A * | 1/1992 | Heraud ................... | C04B 35/80 427/249.1 |

(Continued)

OTHER PUBLICATIONS

International Search Report and Written Opinion for International Application No. PCT/US2014/023133, Dec. 16, 2014, 18 pages.

(Continued)

*Primary Examiner* — Bret Chen
(74) *Attorney, Agent, or Firm* — Brinks Gilson & Lione

(57) ABSTRACT

A high strength ceramic matrix composite and method for same is provided. A fiber preform is provided that is either self-supporting or is constrained by a tool for subsequent processing. The preform is coated with about 0.1 μm to about 5 μm of silicon carbide. The silicon carbide is coated with about 0.05 μm to about 2 μm boron nitride, carbon, or other interface layer. The interface layer is coated with at least about 0.2 μm to about 40 μm of silicon carbide.

20 Claims, 1 Drawing Sheet

(56) References Cited

U.S. PATENT DOCUMENTS

| | | | | |
|---|---|---|---|---|
| 5,187,008 | A | * | 2/1993 | Haller .................. C03C 14/002 427/376.1 |
| 5,397,595 | A | | 3/1995 | Carroll et al. |
| 5,593,728 | A | * | 1/1997 | Moore ............... C04B 35/62844 427/255.24 |
| 5,652,030 | A | | 7/1997 | Delperier et al. |
| 5,681,511 | A | * | 10/1997 | Streckert ............... C04B 35/571 264/29.7 |
| 5,952,100 | A | | 9/1999 | Corman et al. |
| 5,968,653 | A | | 10/1999 | Coppella et al. |
| 6,001,419 | A | | 12/1999 | Leluan et al. |
| 6,068,930 | A | | 5/2000 | Lamouroux et al. |
| 6,197,374 | B1 | | 3/2001 | Huttinger et al. |
| 6,228,453 | B1 | * | 5/2001 | Fareed .................... B32B 18/00 428/403 |
| 6,291,058 | B1 | * | 9/2001 | Goujard ............... C04B 35/565 428/293.4 |
| 6,596,340 | B1 | | 7/2003 | Schneweis |
| 6,630,200 | B2 | | 10/2003 | Wang et al. |
| 7,252,860 | B2 | | 8/2007 | Peetz et al. |
| 7,687,016 | B1 | | 3/2010 | DiCarlo et al. |
| 7,736,554 | B2 | | 6/2010 | Thebault et al. |
| 7,799,375 | B2 | | 9/2010 | Rashed et al. |
| 7,955,973 | B2 | | 6/2011 | Waghray et al. |
| 2006/0163773 | A1 | * | 7/2006 | Gray ..................... C04B 35/573 264/270 |
| 2009/0092786 | A1 | | 4/2009 | Liu et al. |
| 2011/0187030 | A1 | | 8/2011 | Matsunaga et al. |
| 2011/0219775 | A1 | * | 9/2011 | Jarmon ................. C04B 35/573 60/753 |
| 2012/0076927 | A1 | | 3/2012 | Bhatt et al. |

OTHER PUBLICATIONS

Lackey et al., "Laminated C-SiC matrix composites produced by CVI", Journal of the American Ceramic Society, Blackwell Publishing, Malden, MA, USA, vol. 80, No. 1, Jan. 1, 1997, pp. 113-116.

International Search Report for International Application No. PCT/US2014/023133, Jul. 1, 2014, 5 pages.

Yun et al., "Comparison of the Tensile, Creep, and Rupture Strength Properties of Stoichiometric SiC Fibers", 23rd Annual Cocoa Beach Conference, Jul. 1999, 16 pages.

Invitation to Pay Additional Fees and, Where Applicable, Protest Fee for PCT International Application Serial No. PCT/US2014/02134, dated Jun. 18, 2014.

* cited by examiner

METHOD FOR PRODUCING HIGH STRENGTH CERAMIC MATRIX COMPOSITES

RELATED APPLICATIONS

This application is related to and claims priority to U.S. Provisional Patent Application Ser. No. 61/793,945 filed on Mar. 15, 2013 entitled "Method for Producing High Strength Ceramic Composites." The subject matter disclosed in that provisional application is hereby expressly incorporated into the present application in its entirety.

FIELD OF THE DISCLOSURE

The present disclosure relates to structures of, and methods of applying, structural ceramic fiber coatings.

BACKGROUND

Economical and environmental concerns, i.e. improving efficiency and reducing emissions, are driving forces behind the ever increasing demand for higher gas turbine inlet temperatures. A limitation to the efficiency and emissions of many gas turbine engines is the temperature capability of hot section components such as blades, vanes, blade tracks, and combustor liners. Technology improvements in cooling, materials, and coatings are required to achieve higher inlet temperatures. As the temperature capability of Ni-based superalloys has approached their intrinsic limit, further improvements in their temperature capability have become increasingly difficult. Therefore, the emphasis in gas turbine materials development has shifted to thermal barrier coatings (TBC) and next generation high temperature materials, such as ceramic-based materials.

Silicon Carbide/Silicon Carbide (SiC/SiC) Ceramic Material Composite (CMC) materials are prime candidates to replace Ni-based superalloys for hot section structural components for next generation gas turbine engines. The key benefit of SiC/SiC CMC engine components is their excellent high temperature mechanical, physical, and chemical properties which allow gas turbine engines to operate at much higher temperatures than the current engines having superalloy components. SiC/SiC CMCs also provide the additional benefit of damage tolerance, which monolithic ceramics do not possess.

SUMMARY

The present disclosure is directed to methods of applying interface coatings between the ceramic layer and the structural layer.

An illustrative embodiment of the present disclosure includes a method of making a high strength ceramic matrix composite. The method comprises the steps of: forming a fiber preform that is either self-supporting or is constrained by a tool for subsequent processing; coating the preform with about 0.1 μm to about 5 μm of silicon carbide; coating the silcon carbide with about 0.05 μm to about 2 μm boron nitride, carbon or other interface layer; and coating the interface layer with at least about 0.2 μm to about 40 μm of silicon carbide.

In the above and other embodiments, the method of making the high strength ceramic matrix composite may further comprise: forming the fiber preform having a range of about 10% to about 45% fiber by volume; forming the fiber preform with a silicon carbide fiber selected from a group consisting of HiNicalon, HiNicalon S, Tyranno SA3, CefNITE, CG Nicalon, Tyranno ZMI; the first coating includes one or more of the following elements: from about 0% to about 70% silicon, carbon, nitrogen, boron, oxygen, and from 0 to 40% zirconium, titanium, tantalum, hafnium, erbium, ytterbium, dysprosium, gadolinium, niobium, molybdenum, tantalum, Rhenium, Germanium, Tin, or Selenium; the fiber preform being self supporting having an integrally woven and angled interlock architecture; coating the preform by a method selected from the group consisting of chemical vapor infiltration, physical vapor deposition, and directed vapor deposition; and coating the silicon carbide layer that is located over the silicon carbide interface layer with additional layers.

Another illustrative embodiment of the present disclosure includes a method of making a high strength ceramic matrix composite. The method comprises the steps of: forming a fiber preform that is either self-supporting or is constrained by a tool for subsequent processing; coating the preform with about 0.1 μm to about 5 μm of silicon carbide; and coating the silicon carbide interface layer with at least about 0.2 μm to about 40 μm of silicon carbide.

In the above and other embodiments, the method of making the high strength ceramic matrix composite may further comprise: forming a fiber preform that is either self-supporting or is constrained by a tool for subsequent processing; coating the preform with about 0.1 μm to about 5 μm of silicon carbide; and coating the silicon carbide interface layer with at least about 0.2 μm to about 40 μm of silicon carbide; coating the silicon carbide with about 0.5 μm silicon carbide interface layer: forming the fiber preform having a range of about 10% to about 45% fiber by volume; the fiber preform being self-supporting having an integrally woven and angled interlock architecture; coating the preform by a method selected from the group consisting of chemical vapor infiltration, physical vapor deposition, and directed vapor deposition; coating the silicon carbide layer that is located over the silicon carbide interface layer with additional layers; completing the composite by applying a process selected from a group consisting of at least one of chemical vapor infiltration, physical vapor deposition, tape casting, particulate infiltration, pre-ceramic polymer infiltration and pyrolysis, and metal infiltration.

Another illustrative embodiment of the present disclosure includes a method of making a high strength ceramic matrix composite. The method comprises the steps of: forming a Hi-Nicalon preform composed of about 36% fiber volume and assembled in a tooling for chemical vapor infiltration; coating the Hi-Nicalon preform with about 1 μm to about 5 μm of silicon carbide; and coating the silicon carbide with about 0.5 μm boron nitride interface layer; and coating the silicon carbide interface layer with about 2 μm of silicon carbide.

In the above and other embodiments, the method of making the high strength ceramic matrix composite may further comprise: completing the ceramic matrix composite through slurry and melt infiltration; coating the Hi-Nicalon preform with about 1 μm to about 5 μm of silicon carbide by chemical vapor infiltration; and coating the silicon carbide interface layer with about 2 μm of silicon carbide by chemical vapor infiltration.

Another illustrative embodiment of the present disclosure includes a method of making a high strength ceramic matrix composite. The method comprises the steps of: providing a silicon and carbon fiber coated in tow form with about 2 μm of silicon carbide by chemical vapor deposition; and applying a silicon doped boron nitride coat of about 0.3 µm on to the silicon carbide.

In the above and other embodiments, the method of making the high strength ceramic matrix composite may further comprise: wherein the tow being processed with a silicon carbide slurry and binders to form a tape; and laminating the tape; shaping the tape, curing the tape forming a body, and infiltrating the body with silicon.

Another illustrative embodiment of the present disclosure includes a method of making a high strength ceramic matrix composite. The method comprises the steps of: providing a Hi-Nicalon S Preform composed of 36% fiber volume and assembled in tooling for chemical vapor infiltration; cleaning the preform using air about at 600 degrees C. to remove sizing char and surface carbon from the fiber; coating the fiber with about 1.5 µm of silicon carbide; applying a silicon doped boron nitride coat at about 0.5 µm; applying a silicon carbide coat of about 2 µm; and applying a silicon nitride coating of about 0.2 µm on the silicon doped boron nitride coat.

In the above and other embodiments, the method of making the high strength ceramic matrix composite may further comprise: the fiber coated with about 1.5 µm of silicon carbide by chemical vapor deposition; the effective fiber volume after the fiber is coated with about 1.5 µm of silicon carbide is now about 41%; the silicon nitride coating of about 0.2 µm on the silicon doped boron nitride coat is applied by chemical vapor deposition; the silicon carbide coat of about 2 µm being coated by chemical vapor deposition; and the ceramic matrix composite matrix is completed through slurry and melt infiltration.

It should be appreciated that the present application discloses one or more of the features recited in the claims and/or the following features which alone or in any combination may comprise patentable subject matter.

DETAILED DESCRIPTION OF THE DRAWINGS

The present disclosure includes a structural fiber coating with a bonded ceramic layer followed by an interface coating and, optionally, additional coatings. The coating may be the same composition as the fiber, a slightly altered composition, or a totally different composition. One purpose of the coating is to "heal" surface flaws on the fiber and increase the effective fiber volume by increasing the diameter of the fiber. The coating may be uniform in composition and structure, graded intentionally to produce a better match between the fiber and the interface coating, or include multiple thin layers prior to the interface coating.

The structural coating may range from 0.01 µm to 20 µm. The coating may be deposited by chemical vapor deposition, physical vapor deposition (including directed vapor deposition), or other suitable means. The fiber in the composite may be carbon, ceramic (silicon carbide, alumina, aluminosilicate, SiNC etc.), or glass. The coating layer (or layers) may include elemental, binary, or ternary compounds of the following elements: carbon, nitrogen, oxygen, silicon, germanium, boron, aluminum, titanium, zirconium, hafnium, vanadium, nibium, tantalum, chromium, molybdenum, nickel, scandium, yttrium, ytterbium and rhenium.

The structural layer thickness may be limited by a desire to minimize multiple fiber bonding prior to the interface coating. The thickness may vary depending upon the fiber volume and fiber diameter in each application. The coating may be deposited by chemical vapor deposition, physical vapor deposition (including directed vapor deposition) or other suitable means. The fiber in the composite may be carbon, ceramic (silicon carbide, alumina, aluminosilicate, SiNC etc.) or glass.

Illustratively, it may be desirable to tailor the coating composition and/or structure to produce a slightly lower modulus than the fiber. This may reduce stress in the coating layer and delay surface cracking to result in the highest possible strength of the fiber/coating.

Prior to the structural coating, the fiber may be cleaned to remove polymer fiber coatings (sizing). This may be done at any point in time prior to the coating. Suitable cleaning agents may include solvents, hot air, other hot gases, or other means. The cleaning process may enhance the bonding between the fiber and structural coating.

Figure 1:
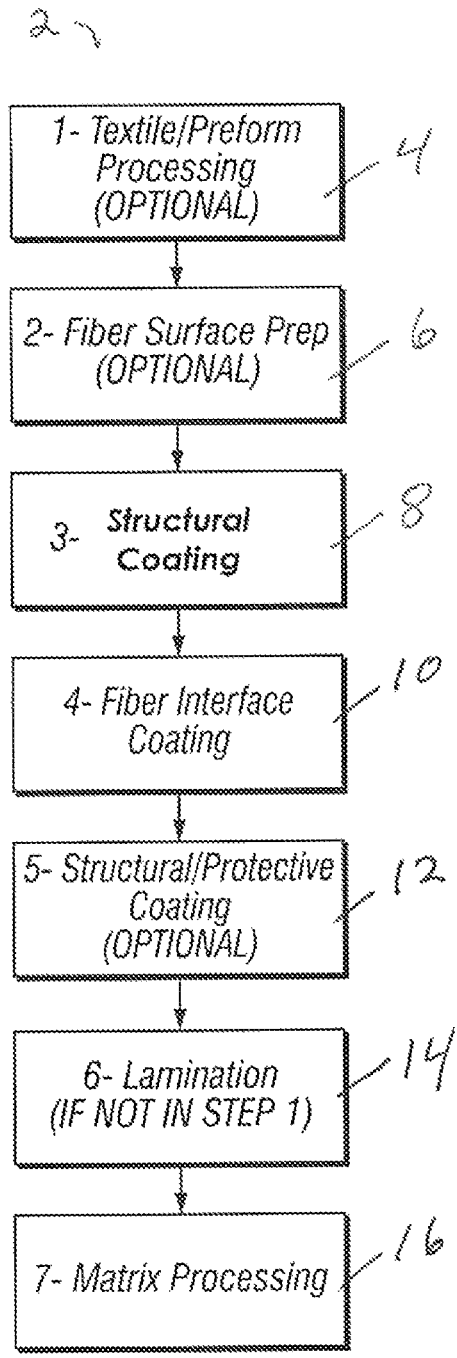
FIG. 1 shows a flow diagram of a process making a composite.

A flow diagram depicting a process 2 of applying a structural coating on a fiber is shown in FIG. 1. The first step of process 2 is providing the fiber material, textile, or preform, for processing at 4. Illustratively, the fiber surface may be prepared by cleaning and using high temperature air to remove sizing char at 6. A structural coating is then applied over the fiber at 8. Silicon carbide may be applied by chemical vapor infiltration or physical vapor deposition. Optionally, over the structural coating, a fiber interface layer may be deposited at 10. The fiber interface coating may be a silicon carbide layer. A structural/protective coating may then be applied at 12 over interface coating 10. Again, the structural/protective coating may be silicon carbide. Optionally, additional layers may be applied over the structural/protective coating at 14 if not done so already at step 1 of process 2 at 4. Lastly, a matrix may be completed with slurry and melt infiltration at 16.

Figure 2:
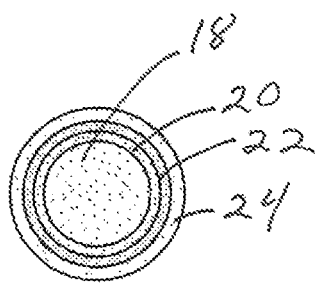
FIG. 2 shows an end view of ceramic fibers of a fiber and coating according to the present disclosure.

An end sectional view of fiber material 18 is shown in FIG. 2. Structural coating 20 such as that described with respect to step 8 in FIG. 1, is applied over fiber 18. Interface coating 22 such as that described at 10 is applied over structural coating 20. Another structural layer 24 may then be applied on top of fiber interface coating 22 such as that described at step 12 of process 2.

Advantages include increased ultimate strength resulting from higher effective fiber volume as the coating becomes part of the fiber; a higher proportional limit, i.e., the increased effective fiber volume results in less stress on the matrix and, therefore, higher stress threshold; an improved fiber strength even when the coating is very thin because surface flaws are reduced; an additional layer provides an opportunity to manage thermal and chemical incompatibilities between a fiber and subsequent coatings; an increased creep strength if the fiber coating has higher creep capability than the fiber; the potential to reduce fiber consumption and therefore CMC cost (assuming better economics for the structural layer); ability to tailor performance and cost of a preform for various applications by varying the composition and thickness of the structural layer; and in preforms, where fiber volumes are limited due to processing constraints (e.g. 3D architectures), this method may be used to achieve the desired performance.

The following are several non-limiting embodiments of the present disclosure:

Preform Based CMC

One Embodiment Includes:

1. A fiber preform is constructed at a fiber volume of about 10% to about 45% and is either self supporting (i.e., integrally woven like an angle interlock architecture), or constrained by a tool for subsequent processing;

2. coating the preform by chemical vapor infiltration (CVI), physical vapor deposition (PVD) or other means, with about 0.1 μm to about 5 μm of silicon carbide;

3. optionally coating the silicon carbide with about 0.5 μm interface layer;

4. coating the silicon carbide interface layer with at least 0.2 μm to about 40 μm silicon carbide; and 5. Optionally additional layers may be applied, completing the composite processing via any combination of surface deposition (e.g., CVI, PVD), tape casting, particulate infiltration, pre-ceramic polymer infiltration and pyrolysis or metal infiltration.

Another Embodiment Includes:

1. A Hi-Nicalon preform is constructed at about 36% fiber volume and assembled in tooling for CVI;

2. the fiber is coated with about 1 μm of silicon carbide (SiC) by CVI; the effective fiber volume is now close to about 39%;

3. a boron nitride (BN) interface coating is applied at about 0.5 μm;

4. a SiC coating of about 2 μm is applied by CVI; and 5. the CMC matrix is completed through slurry and melt infiltration.

The resulting composite has a higher proportional limit, ultimate strength, and creep capability than CMC without the fiber coating in step 2.

CMC Made with Pre-Coated Fiber

1. Hi Nicalon S fiber is coated in tow form with about 2 μm of silicon carbide (SiC) by a chemical vapor deposition (CVD) process;

2. a subsequent process applies a silicon doped boron nitride coating of about 0.3 μm;

3. the fiber in the tow is coated with silicon nitride of about 0.3 μm and silicon carbide of about 0.1 μm;

4. the tow is processed with a SiC slurry and binders to form a tape;

5. the tapes are laminated and shaped then cured; and 6 the resulting body is infiltrated with silicon to complete the CMC component.

The resulting component is stronger, has higher proportional limit and improved creep capability than the material produced without step 1.

Preform Based CMC II

1. A Hi-Nicalon S preform is constructed at about 36% fiber volume and assembled in tooling for CVI;

2. the preform is cleaned using air at about 600 degrees C. to remove sizing char and surface carbon from the fiber;

3. the fiber is coated with about 1.5 μm of SiC by CVI, the effective fiber volume is now close to about 41%;

4. a silicon doped boron nitride (BN) interface coating is applied at about 0.5 μm;

5. a SiC coating of about 2 μm is applied by CVI;

6. a silicon nitride coating of about 0.2 μm is applied by CVI; and 7. the CMC matrix is completed through slurry and melt infiltration.

The resulting composite has a higher proportional limit, ultimate strength, and creep capability than CMC without the coating in step 3. This results in a CMC that demonstrates better mechanical performance that may enable some applications. This benefit may also translate into longer component life, reduced component weight, or lower acquisition cost.

In addition to the fibers described above, the structural coatings discussed herein may be applied to CMCs having fibers with thermal and mechanical properties matched in a particular manner to produce desired results. The disclosure of U.S. Provisional Patent Application No. 61/787,235 is incorporated herein in its entirety by reference. The CMC's of this type may include a matrix having first and second components. The matrix also has a creep rate at a specified temperature wherein one of the first components is present in an amount greater than its stoichiometric amount in relation to the other components. The fibers embedded in the matrix have a lower creep rate at a specified temperature than the creep rate of the matrix as a whole. Other examples discussed in the 61/787,235 priority document may also be subject to the processing steps as described in FIG. 1, producing structures of the type described in FIG. 2, and the illustrative embodiments described herein.

While the disclosure has been described in this detailed description, the same is to be considered as exemplary and not restrictive in character, it being understood that only illustrative embodiments thereof have been described and that changes and modifications that come within the spirit of the disclosure are desired to be protected.

What is claimed is:

1. A method of making a high strength ceramic matrix composite, the method comprising the steps of:

forming a fiber preform that is either self supporting or is constrained by a tool for subsequent processing, wherein the fiber preform comprises fibers that each have a diameter and that define a fiber volume;

coating the fiber preform with about 0.1 μm to about 5 μm of silicon carbide to form a structural coating on the fibers that increases the diameters of the fibers and effectively increasing the fiber volume, wherein the method further comprises cleaning the fiber preform including the fibers after forming the fiber preform and prior to coating the fiber preform to enhance bonding between the fibers and the structural coating;

coating the structural coating of silicon carbide with about 0.05 μm to about 2 μm boron nitride, carbon or other interface layer to form an interface layer overlying the structural coating; and coating the interface layer with about 0.2 μm to about 40 μm of silicon carbide.

2. The method of making the high strength ceramic matrix composite of claim 1, wherein forming the fiber preform comprises forming the fiber preform with the fiber volume of from about 10% to about 45%.

3. The method of making the high strength ceramic matrix composite of claim 1, wherein forming the fiber preform comprises forming the fiber preform comprising a silicon carbide fiber.

4. The method of making the high strength ceramic matrix composite of claim 1, wherein the structural coating includes one or more of the following elements (by volume); from 0 to 70% silicon, carbon, nitrogen, boron, oxygen, and from 0 to 40% zirconium, titanium, tantalum, hafnium, erbium, ytterbium, dysprosium, gadolinium, niobium, molybdenum, tantalum, Rhenium, Germanium, Tin, or Selenium.

5. The method of making the high strength ceramic matrix composite of claim 1, wherein the fiber preform is self supporting having an integrally woven and angled interlock architecture.

6. The method of making the high strength ceramic matrix composite of claim 1, wherein coating the preform comprises forming the structural coating by a method selected from the group consisting of chemical vapor infiltration, physical vapor deposition, and directed vapor deposition.

7. The method of making the high strength ceramic matrix composite of claim 1, wherein coating the interface layer with silicon carbide comprises forming a silicon carbide layer overlaying the interface layer, and wherein the method further comprises the step of: coating the silicon carbide layer that overlays the interface layer with one or more additional layers.

8. The method of making the high strength ceramic matrix composite of claim 1, wherein the fiber preform has the fiber volume of about 36%, and wherein coating the preform comprises forming the structural coating on the fibers to effectively increase the fiber volume to about 39% to about 41%.

9. A method of making a high strength ceramic matrix composite, the method comprising the steps of:
   forming a fiber preform that is either self supporting or is constrained by a tool for subsequent processing, wherein the fiber preform comprises fibers that each have a diameter and that define a fiber volume;
   coating the fiber preform with about 0.1 µm to about 5 µm of silicon carbide to form a structural coating on the fibers that increases the diameters of the fibers and effectively increasing the fiber volume, wherein the method further comprises cleaning the fiber preform including the fibers after forming the fiber preform and prior to coating the fiber preform to enhance bonding between the fibers and the structural coating; and
   coating the structural coating of silicon carbide with about 0.2 µm to about 40 µm of silicon carbide.

10. The method of making the high strength ceramic matrix composite of claim 9, wherein coating the structural coating comprises coating the structural coating with about 0.5 µm of silicon carbide.

11. The method of making the high strength ceramic matrix composite of claim 9, wherein forming the fiber preform comprises forming the fiber preform with the fiber volume of from about 10% to about 45%.

12. The method of making the high strength ceramic matrix composite of claim 9, wherein the fiber preform is self supporting having an integrally woven and angled interlock architecture.

13. The method of making the high strength ceramic matrix composite of claim 9, wherein the fiber preform has the fiber volume of about 36%, and wherein coating the preform comprises forming the structural coating on the fibers to effectively increase the fiber volume to about 39% to about 41%.

14. The method of making the high strength ceramic matrix composite of claim 13, wherein coating the preform with the structural coating effectively increases the fiber volume to about 39%.

15. The method of making the high strength ceramic matrix composite of claim 9, further comprising the step of: forming the high strength ceramic matrix composite by applying a process selected from the group consisting of at least one of chemical vapor infiltration, physical vapor deposition, tape casting, particulate infiltration, pre-ceramic polymer infiltration and pyrolysis, and metal infiltration to form a ceramic matrix.

16. A method of making a high strength ceramic matrix composite, the method comprising the steps of:
   forming a silicon carbide fiber preform comprising fibers that each have a diameter and that define a fiber volume of about 36% and assembling the silicon carbide fiber preform in a tool for chemical vapor infiltration;
   coating the silicon carbide fiber preform with about 1 µm to about 5 µm of silicon carbide to form a structural coating on the fibers that increases the diameters of the fibers and effectively increasing the fiber volume, wherein the method further comprises cleaning the silicon carbide fiber preform including the fibers after forming the silicon carbide fiber preform and prior to coating the silicon carbide fiber preform to enhance bonding between the fibers and the structural coating;
   coating the structural coating of silicon carbide with about 0.5 µm boron nitride interface layer; and
   coating the boron nitride interface layer with about 2 µm of silicon carbide.

17. The method of making the high strength ceramic matrix composite of claim 16, further comprising the step of: forming the ceramic matrix composite through slurry and melt infiltration to form a ceramic matrix.

18. The method of making the high strength ceramic matrix composite of claim 16, wherein coating the silicon carbide fiber preform comprises coating the silicon carbide fiber preform with about 1 µm to about 5 µm of silicon carbide by chemical vapor infiltration.

19. The method of making the high strength ceramic matrix composite of claim 16, wherein coating the boron nitride interface layer comprises coating the boron nitride interface layer with about 2 µm of silicon carbide by chemical vapor infiltration.

20. The method of making the high strength ceramic matrix composite of claim 16, wherein coating the silicon carbide fiber preform comprises forming the structural coating on the fibers to effectively increase the fiber volume to about 39% to about 41%.

\* \* \* \* \*